United States Patent [19]

Raupp, Jr. et al.

[11] 4,274,766
[45] Jun. 23, 1981

[54] CUTTER ASSEMBLY FOR BROACHING

[75] Inventors: Arthur J. Raupp, Jr., Milford; Michael N. Gerasin, Drayton Plains; M. Leonard Thompson, Livonia, all of Mich.

[73] Assignee: The Valeron Corporation, Troy, Mich.

[21] Appl. No.: 98,228

[22] Filed: Nov. 28, 1979

[51] Int. Cl.³ .............................................. B26D 1/12
[52] U.S. Cl. ...................................... 407/15; 407/113
[58] Field of Search ................................. 407/15, 113

[56] References Cited

U.S. PATENT DOCUMENTS

| 2,645,003 | 7/1953 | Thompson | 407/113 |
| 2,730,793 | 1/1956 | Anthony et al. | 407/15 |
| 2,998,634 | 9/1961 | Raehrs et al. | 407/15 |
| 3,464,098 | 9/1969 | Moore et al. | 407/113 |
| 3,540,103 | 11/1970 | Saari | 407/113 |
| 3,621,549 | 11/1971 | Billups | 407/113 |
| 3,656,220 | 4/1972 | Dupuis | 407/15 |
| 3,707,748 | 1/1973 | Price | 407/15 |
| 3,946,472 | 3/1976 | Proulx et al. | 407/15 |

Primary Examiner—Harrison L. Hinson
Attorney, Agent, or Firm—Robert S. Alexander; Donald A. Panek; Ralph T. Rader

[57] ABSTRACT

An indexable insert broach for finishing a cylindrical surface is disclosed. The inserts are mounted on the body of the broach in helical arrays of increasing radii.

2 Claims, 8 Drawing Figures

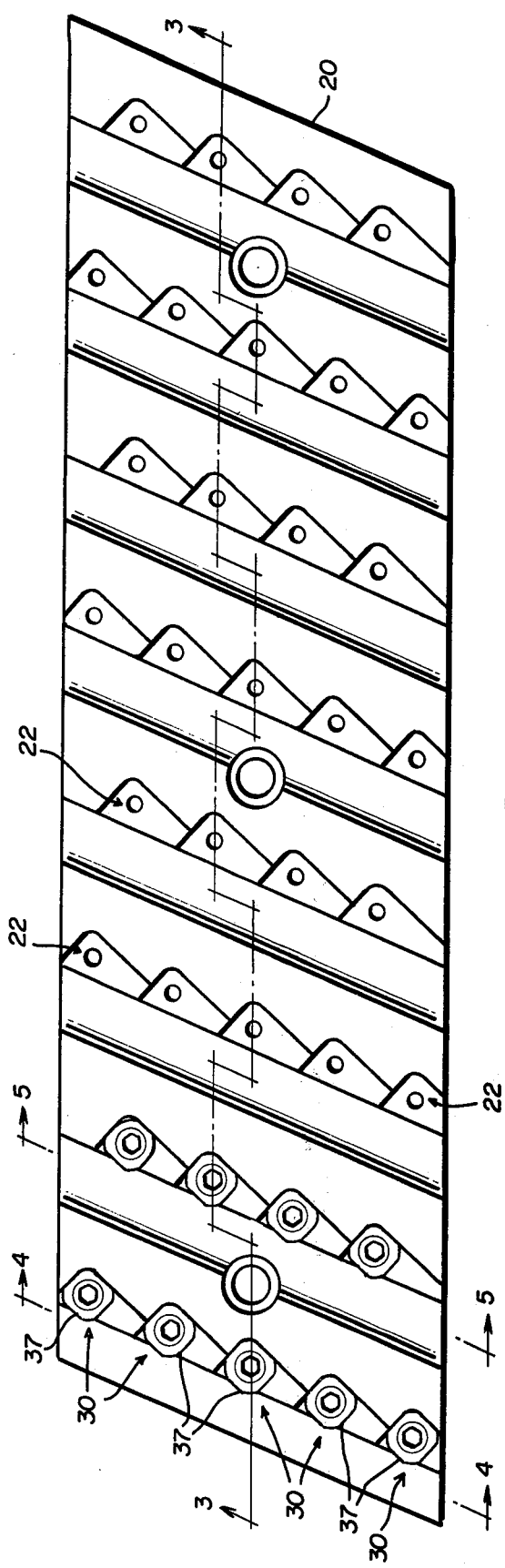
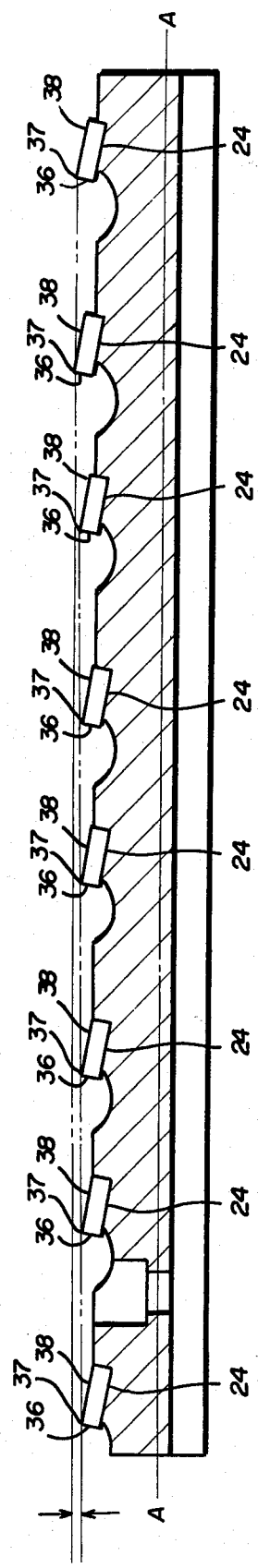
FIG. 2
FIG. 3

CUTTER ASSEMBLY FOR BROACHING

BACKGROUND OF THE INVENTION

Broaching is an excellent method of machining many materials when both precision and high production rates are required. In particular, it is widely used in the automotive industry for forming various contours into engine blocks. While the rate of production of broaches is high, this has been somewhat offset in the past by the relatively high costs of the initial broach and of resharpening the broach after it has become dulled. To overcome the latter of these difficulties, various designs using indexable and reversible inserts have been introduced. However, not all of these designs have been capable of producing cuts that were as precise or economical as could be desired. In particular, some of these designs resulted in uneven chip load upon the inserts which is thought to cause precision lessening vibration. In addition, uneven chip load also results in inserts wearing at varying rates so that either all inserts are indexed at one time even if only some are worn or when production is stopped for indexing or replacement, the worn inserts are indexed or replaced but production is again halted later when other inserts become worn. Either procedure is less than ideal.

A further detriment to some of these designs is found in the uneven power requirements resulting from rows of inserts entering the workpiece simultaneously. Thus, with those designs presenting rows of inserts, the power required would increase suddenly each time a row of inserts contacted the workpiece then decrease suddenly each time a row left the workpiece. It is thought that in some cases, this might have contributed to vibration and hence harmed precision.

The cutter assembly of the present invention provides a broach whereby the chip load on the various inserts can be made more uniform and the power requirement fluctuations caused by multiple inserts simultaneously entering or leaving the workpiece can be reduced.

SUMMARY OF THE INVENTION

The cutter body assembly of the present invention is adapted for finishing all or part of a cylindrical surface and comprises a cutter body and means for mounting a plurality of inserts on said body in a plurality of substantially helical arrays with succeeding helical arrays having increasing radii the mounting means being adapted to receive bulged inserts having bulges with radii of curvature which are greater than the distance from the center of the inscribed circle of the insert to the center of curvature of the bulge.

A preferred cutting assembly of the present invention comprises a cutter body and means for mounting a plurality of inserts on said cutter body in a plurality of pairs of substantially helical staggered arrays, each array in each pair of helical arrays having substantially the same radius and succeeding pairs of helical arrays having increased radii.

In a more preferred embodiment, the mounting means are arranged so that in use said inserts enter the workpiece successively.

In the most preferred embodiment, the mounting means are adapted to receive both round disc inserts and bulged inserts with bulges having radii of curvature which are greater than the distance from the center of the inscribed circle of the insert to the center of curvature of the bulge.

It is preferred that the means for mounting the inserts be adapted so that the projection of the cutting edge of the inserts onto a plane perpendicular to the longitudinal axis of the cutter body defines a curve having a radius of curvature less than or substantially equal to the radius of the cylindrical surface to be broached and thus the superposition of the projections of these curves onto the perpendicular plane defines a substantially smooth cylindrical surface.

BRIEF DESCRIPTION OF THE DRAWINGS

FIG. 2 is a schematic developed view of the cutter body member of FIG. 1.

FIG. 3 is a schematic sectional view of the cutter body member of FIGS. 2 and 3 taken along section line 3—3 illustrating the pitch of the broach.

DETAILED DESCRIPTION OF THE PREFERRED EMBODIMENT

Figure 1:
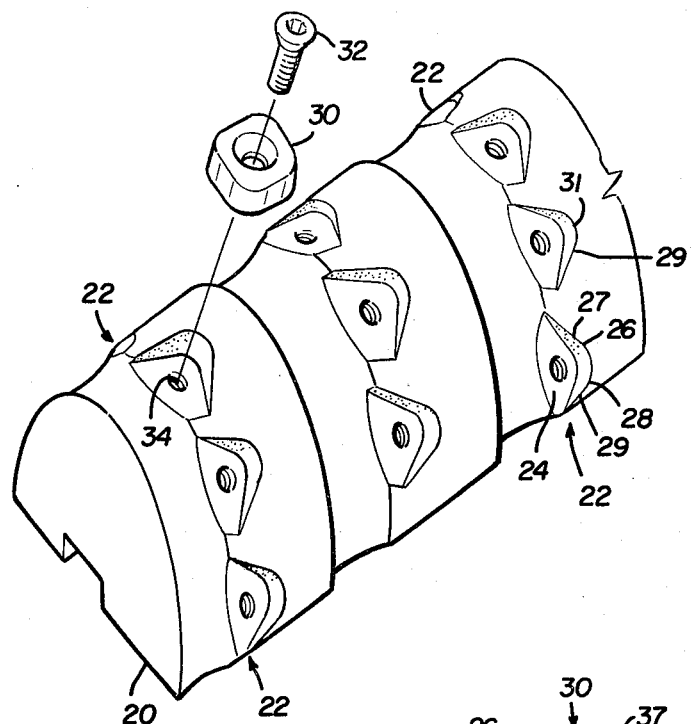
FIG. 1 is a perspective view of the cutter body member of the present invention.
Figure 4:
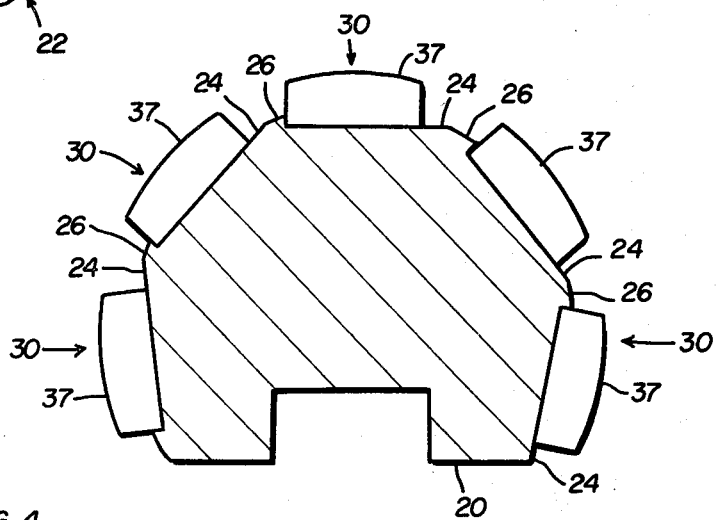
FIGS. 4 and 5 are schematic sectional views along section lines 4—4 and 5—5 illustrating the staggered arrangement of the inserts.
Figure 5:
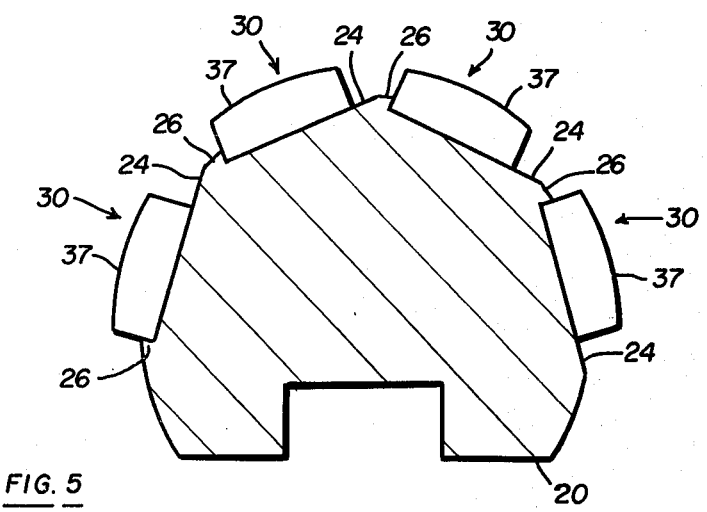

In FIG. 1, cutter body member 20 has a plurality of pockets 22 formed therein. Each pocket 22 has bottom 24 and sidewalls 26 and 28 having flat portions 27 and 29 joined by undercut radiused corners 31 and is adapted to receive insert 30 which is held in place by bolt 32 passing through bore 33 engaging threaded hole 34. As shown schematically in FIGS. 2 and 3, pockets 22 are arranged to mount inserts 30 in pairs of staggered helical arrays each pair of which as can be seen in FIGS. 4 and 5 cuts substantially an entire annular disc from the workpiece (not shown). As also can be seen in FIG. 3, inserts 30 are mounted so that their peripheral face 36 makes an angle of less than 90° with the longitudinal axis of the cutter body member 20, thus as seen in FIGS. 4 and 5 the cutting edges 37a defined by the intersection between the peripheral face 36 and top transverse face 38 of each insert defines a curve which when projected onto a plane normal to the longitudinal axis (indicated at A—A) of the cutter body member has a radius of curvature substantially equal to or less than the radius of curvature of the portion of the cylindrical surface being broached. Therefore, cylindrical surfaces of varying diameters may be broached using either round or bulged inserts merely by varying the angle between peripheral faces 36 and longitudinal axis A—A of the cutter body member 20. Either type of insert may be formed easily since both are substantially planar. Even though a different cutter assembly body will be required for each size of cylindrical surface to be broached, standardized inserts may be used in many different sizes and these inserts may be interchanged between bodies. As illustrated in FIG. 2, each array in each pair of helical arrays are located at substantially the same distance from longitudinal axis A—A of the cutter assembly body.

Since, as seen in FIGS. 2, 4 and 5, inserts 30 are mounted in pairs of staggered helical arrays; each insert 30 bears approximately the same chip load, as every other insert in that pair of arrays because all are located at substantially the same radial distance from longitudinal axis A—A, thus these inserts will wear at approximately equal rates and all inserts in each pair of arrays may be indexed simultaneously without undue waste. In some circumstances, the initial pair of arrays of inserts may wear at a greater rate than the rest of the inserts and more frequent replacement of inserts in the initial pair may be required but the inserts in each subsequent pair of rows will wear at approximately equal rates and unnecessary stoppages will be reduced.

As best seen in FIG. 2, inserts 30 are arranged so that no plane which is perpendicular to the longitudinal axis of cutter body member 20 passes through the cutting edge 37 of more than two inserts 30. Preferably no such plane passes through the cutting edge of more than one insert so that inserts 30 enter the workpiece (not shown) substantially in succession, with the result that the insertion force required for broaching is more uniform throughout the cycle than the force required with designs having inserts arranged in transverse rows are used and in addition is considerably lower. The combined effect of the uniform chip load per insert and the reduced, more nearly uniform insertion force is to increase the precision of the cut since vibration and deflection of both the workpiece and the broach are reduced as compared to the designs where several inserts enter the workpiece simultaneously rather than in succession or where the chip loads on the inserts are not uniform.

Figure 6:
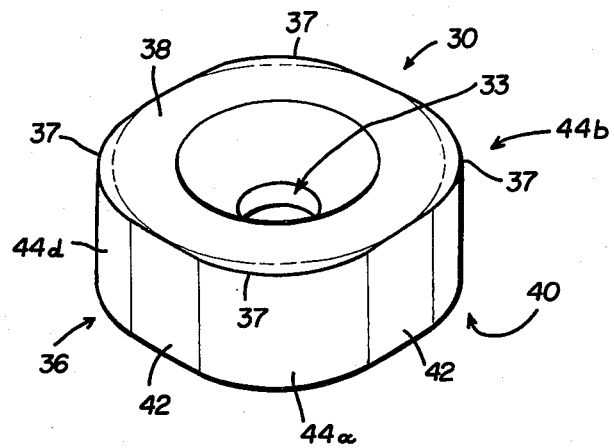
FIG. 6 is a perspective view of the preferred insert for use in the broaching cutter assembly of the present invention.
Figure 7:
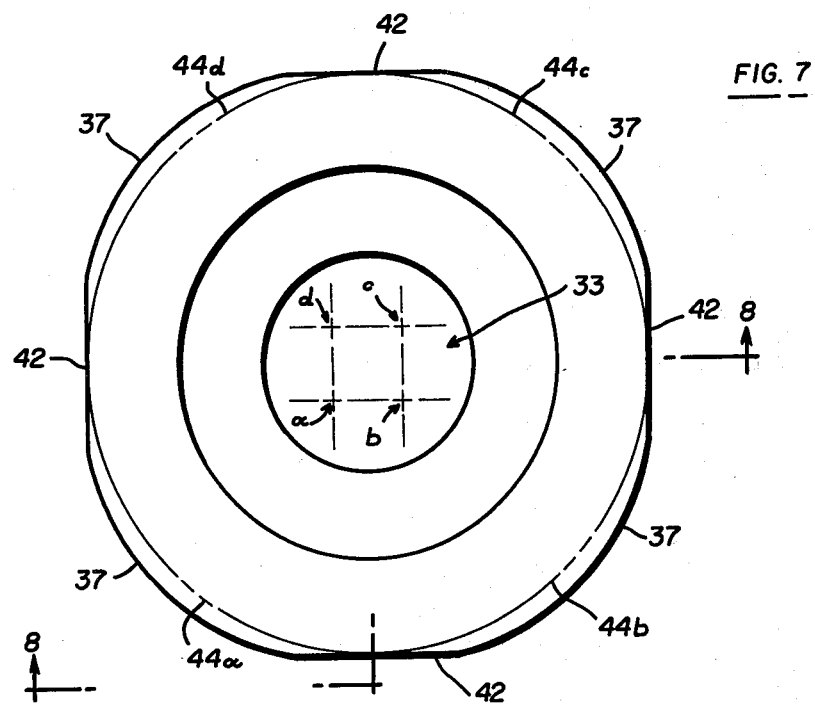
FIG. 7 is a top view of the insert in FIG. 1.
Figure 8:
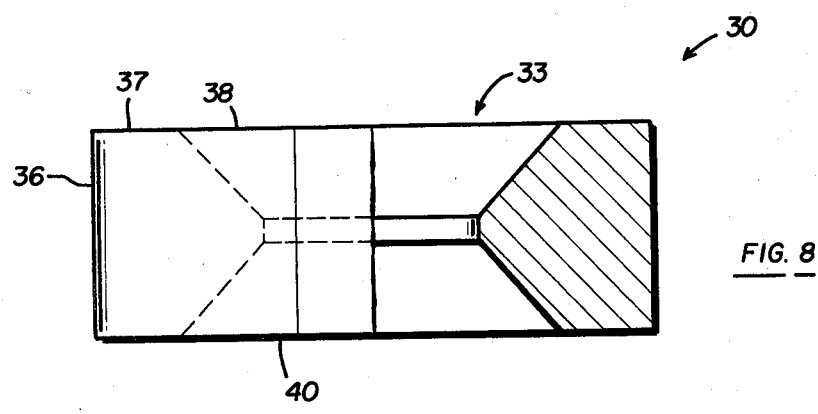
FIG. 8 is a schematic sectional view along the section line 8—8 in FIG. 7.

While standard cylindrical, disc or button type inserts may be used with the cutter assembly of the present invention, it is preferred that inserts of the type shown in detail in FIGS. 6, 7 and 8 be used since these inserts are positively indexable in contrast to cylindrical inserts which can only be indexed approximately thus requiring care, time and the exercise of judgement by the workers who index the inserts. Bulged inserts 30 have planar top transverse surface 38, planar bottom transverse surface 40 and peripheral surface 36 comprising flatted regions 42 and bulges 44 a though d. The center of curvature of each bulge 44a, 44b, 44c and 44d is located at a, b, c, and d respectively. The radius of curvature of each bulge 44a–d is greater than the distance from the center of the inscribed circle of insert 30 to the center of curvature of each bulge 44a–d respectively. In preferred embodiments, the radius of curvature of the bulges is over 4 times the distance from the center of curvature of each bulge to the center of the inscribed circle of the insert. To enable inserts 30 to be easily reversed and indexed, mounting aperture 33 is countersunk from both top transverse face 38 and bottom transverse face 40 both of which are substantially planar. Because both transverse faces are planar, and because corner 31 in body 20 is undercut, inserts 30 may be reversed as well as indexed yielding a total of 8 cutting edges while retaining positive indexability. As illustrated in FIGS. 4 and 5, the intersection of bulges 44a–d of peripheral face 36 and transverse face 38 of inserts 30 define the curved portions of cutting edge 37 which when projected upon a plane which is perpendicular to the longitudinal axis of cutter assembly 20 define curves having local radii of curvature which are substantially equivalent to the local radius of curvature of the cylindrical surface being finished. These radii of curvature may also be less than the radius of curvature of the cylindrical surface being finished but the quality of the surface finish will suffer.

Another advantage of using bulged inserts resides on the fact that in use flatted portions 42 of insert 30 engages side walls 26 and 28 of pocket 22 thereby preventing rotation of inserts 30. In contrast, cylindrical inserts sometimes rotate and loosen during use thereby becoming susceptible to breakage. However, the greatest advantage of using bulged inserts stems from the positive indexability of inserts 30 which results from sidewalls 26 and 28 engaging planar portions 42 and thereby preventing insert 30 from being indexed except in angles which are integral multiples of 360° divided by the number of bulges on insert 30. Thus in this case, insert 30 can only be indexed in multiples of 90° and the indexing process can be accomplished quickly and easily since the worker does not need to observe the inserts closely as would be the case if cylindrical inserts were used.

As our invention, we claim:

1. A broaching tool for finishing a portion of a cylindrical surface up to and including a complete cylinder, said broaching tool comprising:

a cutter body including a plurality of pockets formed therein, each pocket having sidewalls defining planar regions and an undercut radiused corner connecting said planar regions, said pockets being arranged on said cutter body in helical arrays with successive pairs of helical arrays having increasing radii as measured from the longitudinal axis of the cutter body;

a plurality of corresponding cutting inserts mounted to said pockets, each insert including a center, a top planar surface, a bottom planar surface, and a peripheral surface, the peripheral surface of each insert making an angle of less than 90° with the longitudinal axis of said cutter body, said peripheral surface bounding an inscribed circle which has a center coincident with the center of said insert, each of said inserts including a plurality of flat planar surfaces that are parallel to the longitudinal axis of said insert and a plurality of bulges, said flat planar surfaces being substantially tangent to said inscribed circle and each bulge being defined by a corresponding center of curvature and radius of curvature, the radius of curvature of each bulge being at least four times greater than the distance from the center of curvature of each bulge to the center of said inscribed circle, the top planar surface and bottom planar surface of each insert being substantially perpendicular to the longitudinal axis of said peripheral surface and the intersection of the top planar surface and bottom planar surface with the bulges on said peripheral surface defining a plurality of cutting edges; and said flat planar surfaces and pocket planar regions providing an indexing mechanism for each insert whereby each insert is indexable in multiples of 90°.

2. The broaching tool as defined in claim 1 wherein each insert includes a mounting aperture that is countersunk from both the top planar surface and the bottom planar surface for enabling each insert to be reversed and indexed on said cutter body thereby permitting said plurality of cutting edges to be selectively and accurately positioned.

* * * * *